Sept. 18, 1928.
E. A. HULTS
DRIER
Filed Jan. 27, 1925
1,685,026
2 Sheets-Sheet 1
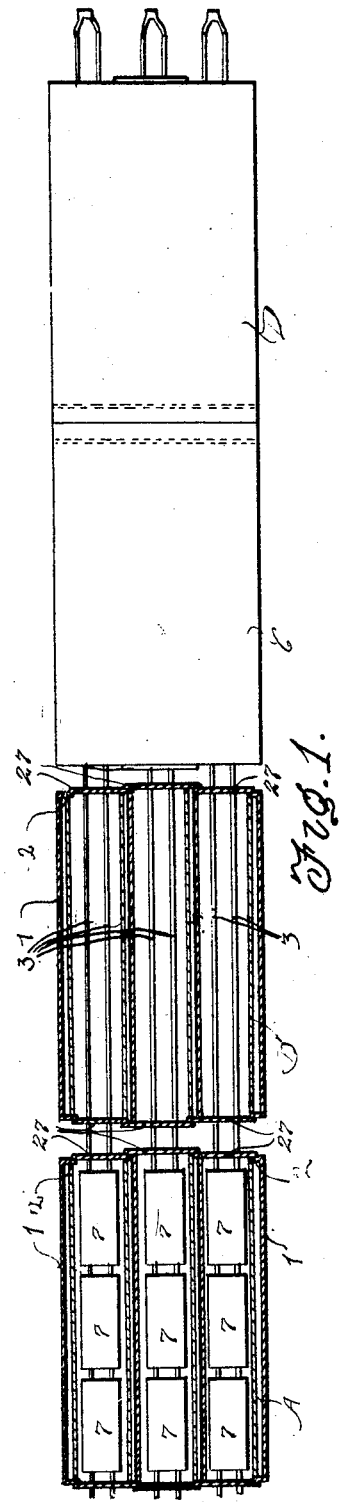
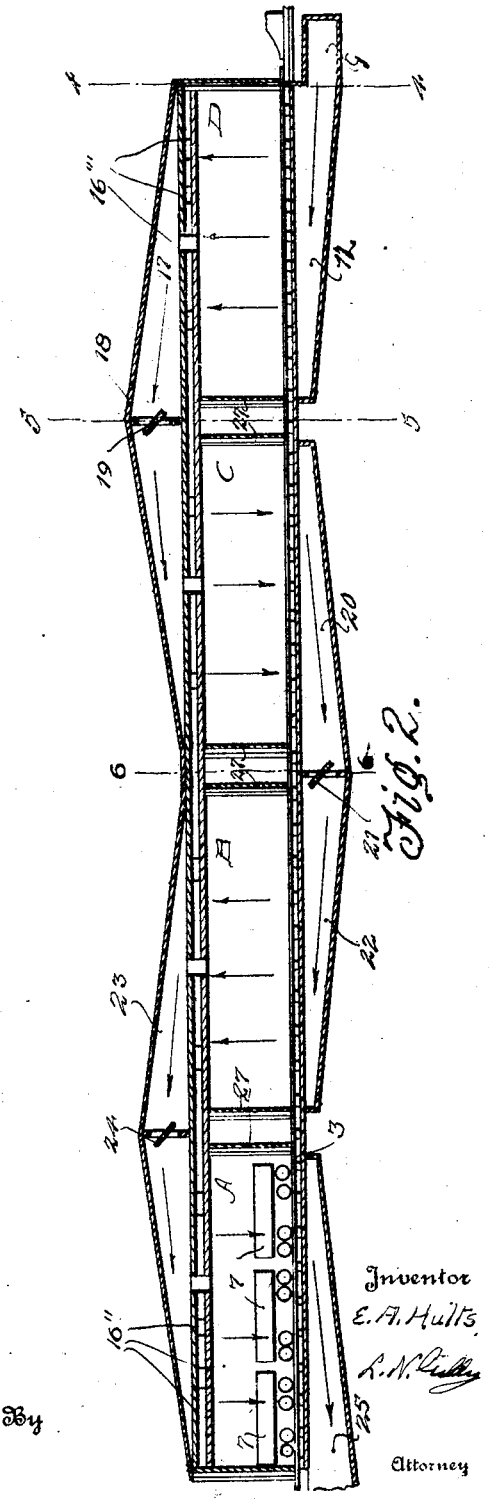
Inventor
E. A. Hults
Attorney Sept. 18, 1928.
E. A. HULTS
1,685,026
DRIER
Filed Jan. 27, 1925
2 Sheets-Sheet 2
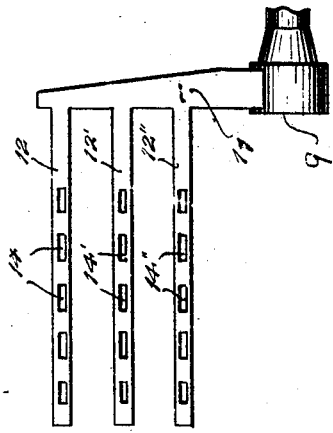
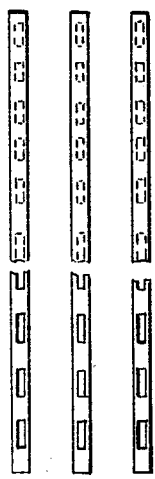
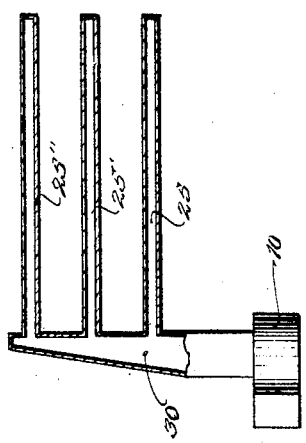
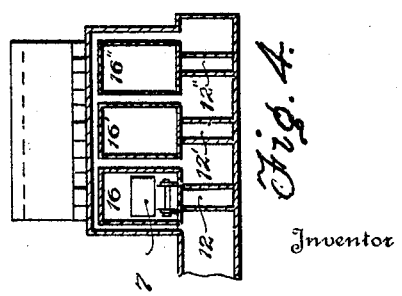

Patented Sept. 18, 1928.

1,685,026

UNITED STATES PATENT OFFICE.

EUGENE A. HULTS, OF SALTVILLE, VIRGINIA.

DRIER.

Application filed January 27, 1925. Serial No. 5,138.

This invention relates to driers in general although it is particularly adapted for drying clay products such as brick, tile, etc., the principal object of the invention being to reduce the labor of handling the products while, at the same time, providing an apparatus for carrying out a process in the most efficient manner without injuring the products as they pass through the drier.

It is a feature of my invention to begin the drying operation with air containing moisture to prevent too rapid drying at first to obviate any excess rapidity of extracting the moisture from the products being dried to cause cracking.

Another feature of my invention is to dry the products in successive steps which enables me to regulate the rapidity of extracting the moisture from the products to an extent which experience proves to be the best to produce the best results.

Another feature of the invention pertains to the provisions for manipulating the products as they pass through the drier without the necessity of the attendant entering the drying rooms or spaces.

With these and other objects in view which will be developed as the description proceeds, I will now describe my invention in connection with the accompanying drawings of which:

Fig. 1 is a floor plan partly in section looking down on the drier.

Fig. 2 is a sectional side elevation of the drier.

Fig. 3 is a top plan view partly in section of the flues of the drier.

Fig. 4 is an end view of the drier on the line 4—4 of Fig. 2.

Fig. 5 is a section on the line 5—5 of Fig. 2.

Fig. 6 is a section on the line 6—6 of Fig. 2.

The drier may consist of several separate compartments A, B, C and D. I show four compartments although it is apparent that a fewer number or a greater number may be used as desired.

Each compartment comprises side walls 1, and end walls 2. For convenience I may extend tracks 3—3 through the compartments on which cars 7—7 may run for transporting the bricks, etc. through the drier. I prefer to have the tracks slightly inclined from their entrance as shown at the left hand end of Figs. 1 and 2 to their exit end at the right in Figs. 1 and 2. This will facilitate the transfer of the cars 7 loaded with the bricks from end to end of the drier.

To insure a proper circulation of the heated air through the drier, I may provide fans 9, 10, the fan 9 being conveniently placed at the air entrance end of the drier and the other fan 10 for withdrawing the air at the air outlet end of the drier. I conveniently use the waste heat from a furnace after it has been used in the production of power or for any other purpose as my drying medium.

The air is forced by the fan 9 through the flue 11 to the separate connecting flues 12, 12′, 12″, through which it is conducted to openings 14, 14′, 14″ into compartments 16, 16′, 16″ through which cars 7 pass from left to right in Figs. 1 and 2. To insure proper circulation, I may provide openings 16‴ in the side walls so the air can pass from one compartment to the other. After the heated air comes in contact with the products, it passes upwardly as shown by the arrows at the right of Fig. 2 into a flue 17 beneath the roof 18 of the drier, thence through an opening provided with a valve 19 shown best in Fig. 2 and downwardly as shown by the arrows in Fig. 2 through the compartment C and its floor to a flue 20 beneath the floor, thence through an opening provided with a valve 21 to a flue 22, thence upwardly through the floor of compartment B to a flue 23, thence through an opening having a valve 24 therein and downwardly through the compartment A and flues 25, 25′, 25″ to the flue 30 and out through fan 10.

At the ends of each of the compartments A, B, C and D, I provide doors or gates 27 which may be either hinged or sliding and between the respective doors of compartments A and B, there is a space through which the attendant may pass to open the doors 27 and manipulate and run the cars 7 through the doors from one compartment to the other. As the tracks on which the cars run are slightly inclined it will not be difficult to move the cars on their tracks through the successive compartments. In practice, the cars are kept in each compartment as long as experience finds is necessary to produce the proper drying operation that should be produced in that particular compartment, and in order to economize the heat, I may leave a space between the compartments 16, 16', 16'' as shown in Figs. 4, 5 and 6.

It will be noticed that the hottest air as it passes through the fan 9, flue 11 and branch flues 12, 12' and 12'' encounters the material to be dried near the end of the drying operation and thus as the heated air passes from compartment D to compartment C, it will absorb the moisture from the material and as it enters compartment C it contains more moisture than it had when it entered compartment B and so on through the other compartments to the last at the left in Figs. 1 and 2. When the heated air reaches the material in its green state, therefore, it is laden with moisture and thus prevents too rapid drying in compartment A into which the material first enters in its passage through the compartments. After the material has remained in the respective compartments a sufficient length of time, the doors 27 are opened long enough to transfer the material out of compartment D, and the material in compartment C is passed on to compartment D, the material in compartment B is passed on to compartment C, the material in compartment A being passed on to compartment B and green material is conducted into the compartment A. After the material is located in a compartment the doors 27 of that compartment are closed and the heated air will be passed through the compartments from the bottom of one to the top of the other alternately as before set forth. I have found that by thus drying the material with air having the proper amount of moisture therein at each stage of the process, it prevents cracking of such material as clay products. The described process dries the clay products without cracking them and in the most economical and expeditious fashion.

Having described my apparatus and the process by which it is operated, what I claim is:

1. A drier comprising a series of compartments connected by a plurality of flues arranged to conduct heated air through the bottom of one compartment, thence upwardly through the same to the top of the next compartment in the series, thence downwardly through the same to the bottom of the next compartment in the series, and finally to the last compartment constituting the entrance compartment of the drier, the series of compartments having a plurality of tracks extending side by side therethrough and a separate flue for each of the plurality of tracks, the separate flues communicating with a single flue with means therein to force air through the plurality of flues and compartments, the compartments being separated one from the other by doors forming part of the permanent structure of the drier and through which the material to be dried may be passed from one compartment to the other, but which when closed will separate each of the compartments one from the other whereby air may be forced through a plurality of flues communicating with each compartment and with a common entrance flue.

2. A drier comprising a series of compartments connected by flues arranged to conduct heated air through the bottom of one compartment, thence to the top of the next compartment in the series, thence to the bottom of the next compartment in the series and finally to the compartment serving as the entrance compartment of the material to be dried, said compartments being normally closed except through said flues, each compartment being separated from the next in the series by doors at the ends of each compartment through which the material to be dried may be passed from one compartment to the other, but which when closed will separate one compartment from the other, except through said flues, there being a space between the doors of adjacent compartments in said series of compartments adapted to accommodate an attendant while manipulating said doors and the material being dried.

3. A drier comprising a series of compartments, an inclined track passing through the respective compartments of the series with cars to transport the material on the track, a flue for conducting heated air to the first compartment of the series, a second flue for conducting heated air from the first compartment of the series to the second and flues for conducting the heated air to succeeding compartments, the flues being arranged alternately below and above the respective compartments, each compartment having doors for permitting passage of the cars from one compartment to another whereby air is conducted from the top of one compartment to the top of the succeeding compartment and from the bottom of that compartment to the bottom of another in the series, the flues being arranged to pass the air alternately through the bottom to the top of one compartment and through the top and thence to the bottom of the succeeding compartment and thus alternately to the end of the series, and there being spaces between the doors of adjacent compartments to accommodate an attendant in manipulating said cars and doors, and valves in the flues for regulating the rate of flow of the heated air.

In testimony whereof I hereunto affix my signature.

EUGENE A. HULTS.